Patented Dec. 15, 1936

2,064,332

UNITED STATES PATENT OFFICE 2,064,332

ICE COLORS

Frithjof Zwilgmeyer, Wilmington, Del., assignor to E. I. du Pont de Nemours & Company, Wilmington, Del., a corporation of Delaware No Drawing. Application July 18, 1935,
Serial No. 31,999

22 Claims. (Cl. 8—5)

This invention relates to azo colors and to methods of manufacturing them. The invention also relates to new compositions of matter, to new chemical compounds, and to processes of preparing them.

The azo dyes are a well-defined group containing the chromophor —N=N—. The chromogen of azo dyestuffs comprises two aryl radicals with the chromophor between them. The monoazo dyes are generally prepared by joining two components of which the first, an amine, is called the azo component, and the second, usually a phenol, an amine, or an active methylene compound, is called the coupling component. In coupling the components, the azo component is diazotized in a manner which will be understood by persons skilled in the art, and is reacted with the second component, often in solution. In this specification we define the term "auxochrome" to include the group, alkyl, alkoxy, aryl, aryloxy, aralkyl, aralkoxy, halogen, nitro, acylamino, trifluoromethyl, carboxamido, sulfonamido, and the sulfonic-acid and carboxylic-acid groups. The two last named have a solubilizing effect on the dyestuff and will not be used where a color insoluble in water is desired.

The prior art azo dyes are applied to fabrics, or to other materials to be dyed, in three general ways: (a) The dyestuff is dissolved or dispersed in a suitable bath and the material is dipped in the bath. To be used in this manner the completed dyestuff must be substantive to the material which is to be dyed. (b) A substantive coupling component is directly affixed to the fabric, which is then treated with the diazotized component, completing the dye on the material. (c) A substantive azo component is directly affixed to the fabric which, treated with the coupling component, completes the dye on the material. In an application filed September 20, 1934 in the names of Miles A. Dahlen et al, Serial No. 744,786, a material is dyed with superior results through the intermediation of a new process with colors which are not themselves substantive and whose components are not substantive. This invention is to a considerable extent a development of the invention disclosed in that application.

It is an object of this invention to prepare superior azo colors. Another object of the invention is to dye materials in colors having superior qualities by commercially and technically satisfactory methods. Another object of the invention is to produce new dyestuffs. Yet another object of the invention is to produce new compositions of matter and processes of preparing them. Still other objects of the invention will be in part hereinafter disclosed and in part apparent to persons skilled in the art.

The objects of the invention are accomplished, generally speaking, by the new dyestuffs and processes of using them which are more fully hereinafter disclosed. More specifically the objects of the invention are accomplished by coupling a diazotized primary arylamine to a furo-acetyl-arylamide. It is within the scope of the preferred form of the invention to prepare these new compounds from mono amines or diamines of the benzene or naphthalene series and from furo-acetyl-arylamides of the mono- or diamine and benzene or naphthalene series, and to make them in the form of pigments, as water-insoluble dyestuffs, and in a less preferred form as water-soluble colors.

In the preferred form of the invention the dyeing of a material, for instance the dyeing of cotton cloth, will be accomplished by impregnating the cloth with an alkaline paste containing a stabilized, diazotized arylamine and a furo-acetyl-arylamide, and by exposing the impregnated cloth for short time to the action of acid vapors, for instance acetic acid vapors, at elevated temperature.

The following description is of the preferred form of the invention, and the disclosure therein should not be interpreted as limiting.

There may be used as the diazo component any primary arylamine. These arylamines are n-auxochrome substituted in some cases and in other cases are without substituents other than the amino group. Generally speaking, the arylamines having auxochrome-substituted nuclei are superior. Among the classes of amines whose members are suitable are the benzenes, naphthalene, diphenyl, anthracene, fluorene, carbazole, azobenzene, stilbene, azoxy-benzene, diphenyl amine, diphenyl ether, diphenyl oxide, diphenyl-sulfone, phenanthrene, and pyrene series. It is understood that this list is exemplary, not limitative. The low cost, excellence, and availability of the aniline and naphthylamine series of arylamines lead to their use in a majority of cases. Exemplary of these classes and of the use of auxochrome substituents are the following compounds: 2-methoxy-naphthylamine; 2-methoxy-aniline; 2-phenoxy-aniline; 2-ethoxy-aniline; 2-chlor-5-methyl-aniline; 2-methyl-aniline; 2-methoxy-5-methyl-aniline; 2-methoxy-4-chlor - 5 - methyl-aniline; 2:5-dimethoxy-aniline; 2:5-diethoxy-aniline; 2:5-dimethoxy-4-chlor-aniline; 5-brom-2-methoxy-aniline; 3-iodo-6-methoxy-aniline; 3-iodo-6-ethoxy-aniline; 3-methyl-4-chlor-aniline; 3-brom-6-ethoxy-aniline; 3-chlor-6-ethoxy-aniline; 3 - ethoxy - aniline; 3 - phenoxy - aniline; 3-methoxy-aniline; 3-brom-6-phenoxy-aniline; 3-iodo-6-phenoxy-aniline; 3-brom - 6 - methyl-aniline; 3-chlor-6-methyl-aniline; 3-methyl-aniline; 3-brom-5-methyl-aniline; 3 - chlor - 6 - phenoxy-aniline; 2:5-dimethyl-4-chlor-aniline; 4-ethyl-aniline; 4 - benzo - trifluor - aniline; 4 - chlor - 2-methoxy-aniline; 4-brom-2-methoxy-aniline; 4-brom-2-ethoxy-aniline; 4 - iodo-2 - methoxy-aniline; 4-methoxy-aniline; 4-chlor-2-ethoxy-aniline; 4 - phenoxy - aniline; 4 - ethoxy - aniline; 4-brom-2-phenoxy-aniline; 4-methoxy-2-chlor-aniline; 4-chlor-2-methyl-aniline; 4-methyl-3-brom-aniline; 4-brom-3-methyl-aniline; 4-methyl-3-chlor-aniline; 4-methyl-aniline; 4-chlor-2:5-dimethyl-aniline; 4-chlor - 2 - phenoxy - aniline; 4-methoxy-3-chlor-aniline; 4-phenoxy-2-chlor-aniline; 4-chlor-2:5-diethoxy-aniline; 3-ethoxy-aniline; 3-methoxy-aniline; 3-methyl-aniline; 3-chlor-2-methyl-aniline; 3-chlor-2-methoxy-aniline; 2 - ethoxy - aniline; 2 - methoxy - aniline; 2-methyl - aniline; alpha - naphthylamine; beta-naphthylamine.

In the practice of the preferred form of the invention the azo component, diazotized, is coupled with a stabilizing agent: For instance, it is joined by the azo group to the nitrogen group of piperidine carboxylic acid. After stabilization this component can be mixed with the coupling component without reaction provided the mixture is alkaline. The presence of an acid medium would break up the stabilized azo component, which would immediately react with the coupling component to form the complete color.

A great variety of compounds are useful as coupling components. This coupling component is a furoyl-acetyl-arylide having an aromatic nucleus that may or may not have an auxochrome substituent. The furoyl-acetyl-arylamide may have an aryl group from any of the known classes, exemplary of which is the list hereinabove given in connection with the diazo components. Exemplary of particular classes, and of the use of auxochrome substituents in the aryl nucleus thereof are the following: furoyl-acetyl-4-chloro-aniline; furoyl-acetyl-4-methyl-aniline; furoyl-acetyl-4-phenetidine; furoyl-acetyl-2:5-diethoxy-aniline; furoyl-acetyl-2-methyl - 5 - chloro - aniline; furoyl-acetyl-2 - methoxy - naphthyl - amine; di-furoyl - acetyl - tolidine - sulfone; furoyl - acetyl-2:5-dimethyl-4-chloro-aniline; furoyl-acetyl-2:5-diethoxy-4-chloro-aniline; furoyl-acetyl-2-methoxy-aniline; furoyl - acetyl - 2:5 - dimethoxy-aniline; furoyl-acetyl-2-methoxy-5-chloro-aniline; furoyl-acetyl-para-anisidine; furoyl-acetyl - tolidine-azone; and those which are elsewhere herein disclosed.

Methods of preparing these new compositions of matter are disclosed in my copending application filed of even date herewith.

In the form of the invention which involves the dyeing of a cloth by the so-called process of printing, the azo component, diazotized and stabilized in the well-known manner, is mixed in a basic paste with the second component, and the paste is applied to an etched or "printing" roller which impregnates the fabric by contact. The fabric may then be placed in a closed container to be subjected for a few seconds at elevated temperature to the action of the fumes of an acid, usually in the presence of water vapor. The acid used may conveniently be acetic acid. The acid neutralizes the basicity of the paste, the piperidine-alpha-carboxylic-acid complex is broken up, the first component is freed, and reacts with the coupling component.

The colors which are formed by this invention fall generally within the name aryl-azo-furoyl-acetyl - arylamides. This term includes compounds having the following formulae:

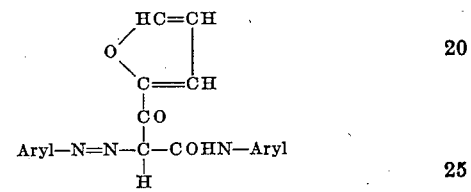

in which "Aryl" represents an aryl nucleus, and which are made by coupling a diazotized arylamine to a furoyl-acetyl-arylamide;

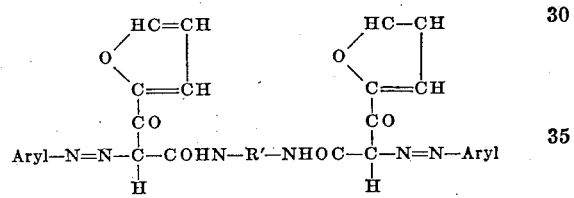

in which "Aryl" represents an aryl nucleus, R' is an arylene diamine nucleus, and which are made by coupling a diazotized arylamine to a furoyl-acetyl-arylene-diamine; and

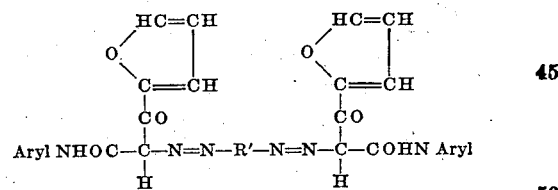

in which "Aryl" is an aryl nucleus as above described, and R' is a tetrazotized arylene-diamine. These compounds are made by coupling a tetrazotized arylene-diamine to a furo-acetyl-arylamide.

The following examples, in which parts are by weight, illustrate but do not limit the invention.

*Example I*

A printing paste was prepared from the following ingredients:

| | Parts |
|---|---|
| Diazo-imino compound prepared by the reaction of diazotized 4-chlor-2-amino-toluene with the sodium salt of piperidine-alpha-carboxylic-acid in alkaline solution | 3.2 |
| 4-ethoxy-furoyl-acetanilide | 2.8 |
| Ethylene-glycol-mono-ethyl-ether | 6.0 |
| A 26% solution of sodium hydroxide | 2.0 |
| Starch: gum tragacanth thickener | 50.0 |
| Water at 140° F | 36.0 |
| | 100.0 |

Cotton goods were printed with the above paste from an engraved copper roll, and then were dried. The printed cotton was exposed for 1 and ¼ minutes to the vapors of a boiling 5% solution of acetic acid; it was next rinsed, soaped for 1 minute at 150° F. in a 1% soap solution, rinsed and dried. The treated goods were dyed a brilliant reddish yellow by the insoluble dyestuff of the probable formula:

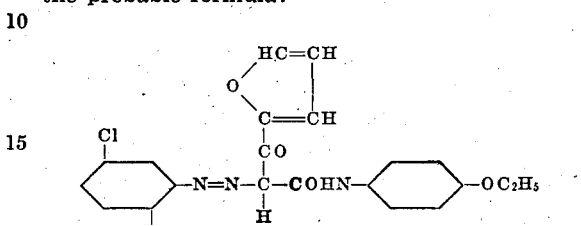

The dyeings possessed a high degree of fastness to light, laundering and bleaching agents.

*Example II*

A printing paste was prepared from the following ingredients:

| | Parts |
|---|---|
| Diazo-imino compound prepared by the reaction between diazotized 4-chlor-2-amino-anisole and the sodium salt of piperidine-alpha-carboxylic-acid in alkaline solution | 3.2 |
| 4-ethoxy-furoyl-acetanilide | 2.8 |
| Ethylene-glycol-mono-ethyl-ether | 6.0 |
| A 26% solution of sodium hydroxide | 2.0 |
| Starch: gum tragacanth thickener | 50.0 |
| Water at 140° F | 36.0 |
| Total | 100.0 |

Cotton goods were printed with the above paste from an engraved copper roll, and then were dried. The cloth was exposed for 1 and ¼ minutes to the vapors of a boiling 5% solution of acetic acid. It was then rinsed, soaped for 1 minute at 160° F. in a 1% soap solution, rinsed again and dried. The cloth was dyed a bright reddish yellow by the dyestuff represented by the formula:

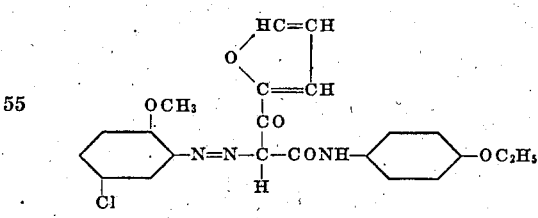

The dyeings possessed a satisfactory degree of fastness to light, laundering and bleaching agents.

*Example III*

The color components in the printing paste described in Example I were replaced by these:

| | Parts |
|---|---|
| Diazo-imino compounds prepared by the reaction of diazotized 6-chlor-2-amino-toluene with the sodium salt of piperidine-alpha-carboxylic acid in alkaline solution | 3.2 |
| And 4-ethoxy-furoyl-acetanilide | 2.8 |

The paste was applied on cotton goods and developed in the manner described in the previous examples. The goods were dyed a reddish yellow by the dyestuff represented by the formula:

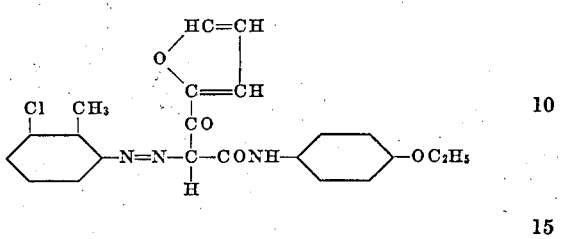

The dyeings possessed a satisfactory degree of fastness to light, laundering and bleaching agents.

*Example IV*

A printing paste was prepared from the following ingredients:

| | Parts |
|---|---|
| Diazo-imino compound prepared by the reaction between diazotized 6-chlor-2-amino-toluene and the sodium salt of piperidine-alpha-carboxylic acid in alkaline solution | 3.1 |
| 2:5-dimethyl-4-chlor-furoyl-acetanilide | 2.9 |
| Ethylene-glycol-mono-ethyl-ether | 6.0 |
| A 26% solution of sodium hydroxide | 2.0 |
| Starch: gum tragacanth thickener | 50.0 |
| Water at 140° F | 36.0 |
| Total | 100.0 |

Cotton goods were printed with this paste from an engraved copper roll, and dried. The cloth then was exposed for 1 and ¼ minutes to the vapors of a boiling 5% solution of acetic acid; it was then rinsed, soaped for 1 minute at 160° F. in 1% soap solution, rinsed and dried. The goods were dyed a reddish yellow by a dyestuff represented by the formula:

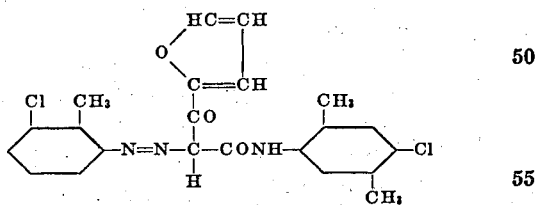

The dyeings possessed a satisfactory degree of fastness to light, laundering and bleaching agents.

*Example V*

The color components in the printing paste described in Example I were replaced by the following:

| | Parts |
|---|---|
| Diazo-imino compound prepared by the reaction between diazotized 6-chlor-2-amino-toluene and piperidine-alpha-carboxylic acid | 3.1 |
| 2-methyl-5-chlor-furoyl-acetanilide | 2.9 |

The paste was prepared, applied and developed on the fiber in the manner described in the previous examples. The fiber was dyed a bright reddish yellow by the dyestuff represented by the formula:

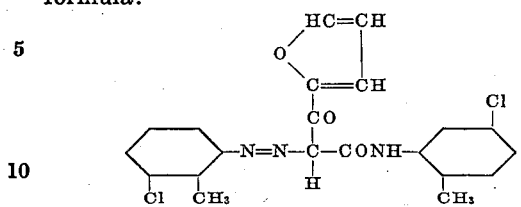

The dyeings possessed a satisfactory degree of fastness to light, laundering and bleaching agents.

The following color components also yield yellow dyestuffs of commercial interest when developed on cotton goods in the manner previously described:

The following examples illustrate the phase of the invention in which a diazotized arylamine is coupled to a furoyl-acetyl-arylene-diamide:

*Example XII*

A printing paste was prepared from the following ingredients:

| | Parts |
|---|---|
| Water-soluble diazo-imino compound prepared by the action of diazotized 4-chloro-2-amino-toluene on piperidine-alpha-carboxylic acid | 3.3 |
| Bis-(furoyl-acetyl)-tolidine-sulfone | 2.7 |
| Ethylene-glycol-mono-ethyl-ether | 6.0 |
| A 26% solution of sodium-hydroxide | 2.0 |
| Starch: gum tragacanth thickener | 50.0 |
| Water at 140° F | 36.0 |
| Total | 100.0 |

| Example No. | Coupling component | Diazo component | Formula representing the dyestuff |
|---|---|---|---|
| VI | 4-methyl-furoyl-acetanilide | 4-chlor-2-amino-toluene | |
| VII | 4-methyl-furoyl-acetanilide | 4-chloro-2-amino-anisole | |
| VIII | 2:5-diethoxy-furoyl-acetanilide | 4-chloro-2-amino-anisole | |
| IX | 2:5-diethoxy-furoyl-acetanilide | 4-chloro-2-amino-anisole | |
| X | 2:5-diethoxy-4-chlor-furoyl-acetanilide | 4-chloro-2-amino-anisole | |
| XI | 2:5-diethoxy-4-chloro-furoyl-acetanilide | 4-chloro-2-amino-toluene | |

Cotton goods were printed with the above paste, and the color developed as in Example I. The pattern appeared as a bright yellow represented by the formula:

[Chemical structure diagram]

| Example No. | Coupling component | Diazo component | Formula representing the dyestuff |
|---|---|---|---|
| XIII | Bis-(furoyl-acetyl)-tolidine. | 4-chloro-2-amino-toluene. | [Chemical structure] (Yellow) |
| XIV | Bis-(furoyl-acetyl)-1:5-diamino-naphthalene. | 4-chloro-2-amino-anisole. | [Chemical structure] (Yellow) |
| XV | 2:5:4'-trimethoxy-4-aminoazo-benzene. | Bis-furoyl-acetyl-tolidine-sulfone. | Red. |
| XVI | Furoyl-acetyl-para-anisidine. | Dianisidine | Orange. |
| XVII | Furoyl-acetyl-4-chloro-2-amino-anisole. | Dianisidine | Reddish-yellow. |

In the foregoing examples, the colors have been produced by the use of the diazo-components in the form of their water-soluble diazo-imino derivatives. However, it will be understood that the colors also may be produced by the use of the diazo salts prepared from the diazo components, by the use of the nitrosamines (anti-diazotates), and by the other methods well-known in the art.

The examples illustrate the application of the colors to cotton. However, they may be applied also to other materials, e. g. regenerated cellulose, cellulose esters and ethers, wool and silk.

It also will be apparent that the colors may be produced in the form of insoluble pigments by the procedures well recognized in the art. For instance, if it is desired to prepare the color apart from a material, the preparation can be carried out by dissolving or suspending the coupling component in an aqueous medium, adding the diazo solution in the presence of an acid binding agent, such as sodium acetate, sodium bicarbonate, and sodium carbonate, or the like. The colors formed are insoluble in water, and are separated by precipitation and filtration. Such pigments are of value e. g. in the coloring of rubber, in printing inks, and in plastics.

The foregoing examples illustrate the use of the colors as self-shades. However, they also may be used in mixtures, to produce a wide range of shades. For example, the product of Example No. I may be mixed in various ratios with the mixture of the water-soluble diazo-imino derivative of 4-chloro-2-amino-toluene and the orthophenetidide of 2:3-hydroxy-naphthoic-acid. From such a mixture, brilliant orange shades of excellent fastness may be produced by the usual processes of dyeing and printing. Likewise, the colors may be produced in combinations with reds and blues to yield a wide range of browns and blacks.

Among the stabilizing agents useful in stabilizing the azo component I name, as examples but not as a limitation: sarcosine, ethyl-taurine, proline, 4-sulfo-2-amino-benzoic acid, methyl-glucamine. The use of stabilizers such as these for the preparation of water-soluble diazo amino compounds is well-known in the art.

By this invention there may be produced dyes which are of outstanding fastness, some of which appear to be equal to vat dyes in this regard, and which, being much less expensive, are of great commercial value. These dyes constitute a great advance over the insoluble yellow azo dyes known to the prior art, being far more permanent. Other advantages of the invention reside in the extension of the inventive idea of the above-identified Dahlen et al. application and in the processes thereof.

As many apparently widely different embodiments of this invention may be made without departing from the spirit and scope thereof, it is to be understood that I do not limit myself to the specific embodiments thereof except as defined in the appended claims.

I claim:

1. The method of dyeing which comprises impregnating cotton goods with a paste containing 2.3 parts of chlor-methyl-benzene-azo-alpha-carboxy-piperidine, 2.8 parts of 4-ethoxy-furoyl-acetanilide, 6 parts ethylene-glycol-mono-ethyl-ether, 2 parts 26% sodium hydroxide water solution, 50 parts starch gum tragacanth thickener, and 36 parts water, drying the goods, exposing it for one and one-quarter minutes to the vapors of 5% acetic acid water solution, rinsing, soaping for one minute at 150° F. in a 1% soap water solution, rinsing and drying, the goods being dyed yellow.

2. The method of dyeing which comprises impregnating a material with an alkaline paste containing chloro-methyl-benzene-azo-alpha-carboxy-piperidine, 4-ethoxy-furoyl-acetanilide-ethylene-glycol-mono-ethyl-ether, and starch gum tragacanth thickener and water, drying the material exposing it at elevated temperature to acetic acid vapors, rinsing, soaping, rinsing, and drying.

3. The method of dyeing which comprises impregnating a material with an alkaline paste containing chloro-methyl-benzene-azo-carboxy-piperidine, 4-ethoxy-furoyl-acetanilide, ethylene-glycol-mono-ethyl-ether, a thickener, and water, and acidifying, washing, and drying the impregnated material.

4. The process which comprises incorporating in an alkaline medium roughly equivalent quantities of chloro-methyl-benzene-azo-carboxy-piperidine and 4-ethoxy-furoyl-acetanilide, acidifying the medium, and removing the colored product therefrom.

5. The process which comprises coupling a diazotized arylamine of the class consisting of the benzene, naphthalene, diphenyl, anthracene, carbazole, azo-benzene, azoxy-benzene, diphenyl-amine, diphenyl-ether, phenanthrene, and pyrene series to a furoyl-acetyl-arylamide one of a group consisting of benzene, naphthalene, diphenyl, anthracene, carbazole, azo-benzene, azoxy benzene, diphenylamine, diphenyl-ether, phenanthrene, and pyrene, the aryl nuclei of which may have as substituents members from the group consisting of alkyl, alkoxy, aryl, aryloxy, aralkyl, aralkoxy, halogen, nitro, acylamino, trifluoromethyl, carboxamido, and sulfoamido.

6. The method of making a dyestuff of yellow cast which comprises coupling a diazotized primary arylamine to a furoyl-acetyl-arylamide.

7. Chloro-methyl-benzene-azo-furoyl-acetyl-phenetidine.

8. A dye being a diazotized primary arylamine coupled to a furoyl-acetyl-arylamide.

9. A dye being the product of coupling a diazotized primary arylamine to a furoyl-acetyl-arylene-diamide.

10. A dye being the product of coupling a tetrazotized arylene diamine to a furoyl-acetyl-arylamide.

11. A product represented by the formula:

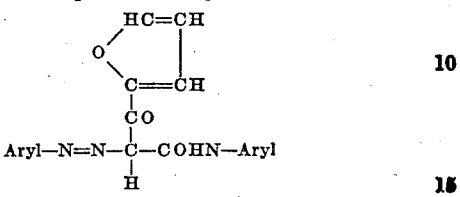

in which the aryl nuclei has as substituents one or more of the group alkyl, alkoxy, aryl, aryloxy, aralkyl, aralkoxy, halogen, nitro, acylamino, trifluoro-methyl, carboxamido, hydrogen and sulfonamido.

12. The product represented by the formula:

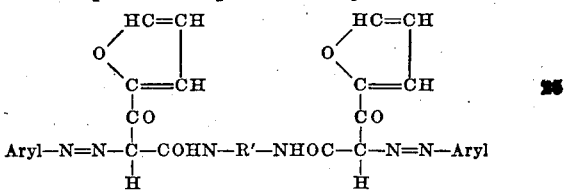

in which R' is the nucleus of an arylene diamine.

13. The product represented by the formula:

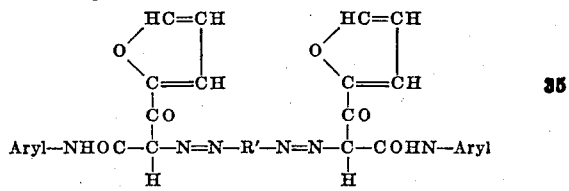

in which R' is the nucleus of a tetrazotized arylene diamine.

14. The product represented by the formula:

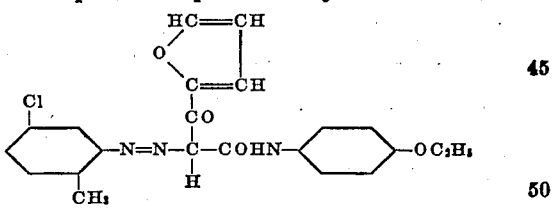

15. A fiber dyed with the dyestuff of claim 11.
16. A fiber dyed with the dyestuff of claim 12.
17. A fiber dyed with the dyestuff of claim 13.
18. A fiber dyed with the dyestuff of claim 14.

19. The process which comprises incorporating in an alkaline medium a diazotized arylamine of the class consisting of the benzene, naphthalene, diphenyl, anthracene, carbazole, azo-benzene, azoxy-benzene, diphenylamine, diphenyl-ether, phenanthrene, and pyrene series, and a furoyl-acetyl-arylamide, and acidifying the medium.

20. The process which comprises incorporating in an alkaline medium diazotized chlor-amino-toluene and furoyl-acetyl-phenetidine, and acidifying the medium.

21. The process which comprises incorporating in an alkaline medium a diazotized primary arylamine and a furoyl-acetyl-arylamide, and acidifying the medium.

22. The process which comprises incorporating in an alkaline medium a tetrazotized arylene diamine and a furoyl-acetyl-arylamide, and acidifying the medium.

FRITHJOF ZWILGMEYER.

CERTIFICATE OF CORRECTION.

Patent No. 2,064,332. December 15, 1936.

FRITHJOF ZWILGMEYER.

It is hereby certified that error appears in the printed specification of the above numbered patent requiring correction as follows; Page 6, second column, line 17, claim 11, after the word "group" insert consisting of; and that the said Letters Patent should be read with this correction therein that the same may conform to the record of the case in the Patent Office.

Signed and sealed this 30th day of March, A. D. 1937.

(Seal)

Henry Van Arsdale
Acting Commissioner of Patents.